United States Patent [19]

Brown et al.

[11] Patent Number: 4,661,878
[45] Date of Patent: Apr. 28, 1987

[54] OVERVOLTAGE PROTECTION CIRCUIT

[75] Inventors: Leland T. Brown, Phoenix; Byron G. Bynum, Tempe, both of Ariz.

[73] Assignee: Motorola Inc., Schaumburg, Ill.

[21] Appl. No.: 764,513

[22] Filed: Aug. 9, 1985

Related U.S. Application Data

[63] Continuation of Ser. No. 573,531, Jan. 25, 1984, abandoned.

[51] Int. Cl.$^4$ .............................................. H02H 3/20
[52] U.S. Cl. ........................................ 361/56; 361/91; 361/111
[58] Field of Search ................... 361/91, 56, 111, 110

[56] References Cited

U.S. PATENT DOCUMENTS

| | | | |
|---|---|---|---|
| 3,213,349 | 10/1965 | Gutzwiller | 361/56 X |
| 3,246,206 | 4/1966 | Chowdhuri | 361/91 |
| 3,968,407 | 7/1976 | Wilson | 361/56 X |
| 4,050,018 | 9/1977 | Goodman | 361/91 X |
| 4,389,695 | 6/1983 | Carpenter, Jr. | 361/56 X |
| 4,455,586 | 6/1984 | McCartney | 361/56 |

OTHER PUBLICATIONS

"Flasher for Pop Music or Motion-Stopping Strobe" by R. M. Fisher, Popular Electronics, Nov. 1972.
Popular Electronics, Dec. 1969.

*Primary Examiner*—A. D. Pellinen
*Assistant Examiner*—D. S. Jennings
*Attorney, Agent, or Firm*—Dale E. Jepsen

[57] ABSTRACT

An overvoltage protection circuit for directing a surge current on an input/output line, in particular, a telephone line, to a ground terminal when the surge current exceeds a predetermined level.

3 Claims, 3 Drawing Figures

OVERVOLTAGE PROTECTION CIRCUIT

This application is a continuation, of application Ser. No. 573,531, filed 1-25-84 now abandoned.

BACKGROUND OF THE INVENTION

The present invention relates, in general, to an overvoltage protection circuit. More particularly, the present invention relates to an overvoltage protection circuit of especial utility in providing secondary protection from transient current surges to an input/output line, in particular, in telephone applications.

Numerous applications require overvoltage protection circuits. U.S. Pat. No. 4,321,644 issued to Brasfield for "Power Line Transient Limiter" issued Mar. 23, 1982 describes a transient limiter for suppressing high voltage transients induced on an alternating current carrying power line in aircraft applications. U.S. Pat. No. 4,306,185 issued to Leuschner for a "Breakdown Voltage Protection Circuit" issued Dec. 15, 1981 discloses a high voltage breakdown protection circuit for limiting the voltage applied to a junction of an MOS circuit.

In telephonic applications in particular, transients can appear on the ring and tip lines to various telephone equipment due to their location adjacent power lines on telephone poles. These power lines can induce longitudinal, or common mode, signals on the telephone lines which can also be induced by the crosstalk of adjacent telephone lines. In addition, transients can appear on the ring and tip lines due to near lightning misses, environmental static discharge, faulty equipment or by vandalism. Primary overvoltage protection due to lightning, etc., is provided by either a carbon arc block, a gas discharge tube, spark gap or other means for providing protection between 300 to 800 volts. However, at lower voltage levels, there exists a need to allow voltages on the telephone line to exceed the power supply voltages without forward biasing an overvoltage protection network and to maintain overvoltage protection at a reasonable voltage level and pass all surge current to system ground or earth potential. To this end, U.S. Pat. No. 4,323,942 issued to Hartman et al for a "Solid State Protector Circuitry Using Gated Diode Switch" issued Apr. 6, 1982 describes a circuit to facilitate the rapid discharge of high voltage transients, in particular on telephone lines. However, the circuitry therein described is incapable of returning a transient appearing on a telephone line to ground or earth potential. U.S. Pat. No. 4,377,832 issued to Toney et al for a "Voltage Transient Suppressor Circuit" issued Mar. 22, 1983 describes a circuit for use with telephonic systems in which negative voltage transients are shorted to earth potential such that the telephone equipment, for example an integrated circuit subscriber loop interface circuit (SLIC), are not damaged by negative high voltage transients. The circuit disclosed in the foregoing patent, while a decided improvement over a conventional diode bridge circuit, nonetheless requires connection to the −48 volt battery supply located at the telephone central office.

It is therefore an object of the present invention to provide an improved overvoltage protection circuit.

It is further an object of the present invention to provide an improved overvoltage protection circuit which does not require connection to the central office power source.

It is still further an object of the present invention to provide an improved overvoltage protection circuit which is of particular utility in telephonic applications.

It is still further an object of the present invention to provide an improved overvoltage protection circuit which is readily and inexpensively fabricated utilizing a minimum of components.

It is still further an object of the present invention to provide an improved overvoltage protection circuit which can provide overvoltage protection for surge currents of any predetermined value.

SUMMARY OF THE INVENTION

The foregoing and other objects are achieved in the present invention wherein there is provided an overvoltage protection circuit for directing a surge current on an input/output line to a ground terminal when the surge current exceeds a predetermined level thereof which includes means coupled to the ground terminal for selectively switching between a blocking state when the surge current is below the predetermined level to a passing state when the surge current is above the predetermined level. Unidirectional coupling means couple the input/output line to the switching means. In a particular embodiment of the overvoltage protection circuit, a diode couples the input/output line to a voltage node while an SCR couples the voltage node connected to an input lead thereof to the ground terminal connected to the output lead. Reference voltage means are coupled to the voltage node and to the gate lead of the SCR for causing the SCR to conduct the surge current to the ground terminal when the surge current exceeds a predetermined level.

Another overvoltage protection circuit in accordance with the present invention directs the surge current on an input/output line to a ground terminal when the surge current exceeds a predetermined level thereof which includes means for unidirectionally coupling the input/output line to a voltage node. A trigger device couples the voltage node to the ground terminal, the trigger device having a blocking condition thereof when a voltage at the voltage node is below the predetermined level and a passing condition thereof when a voltage at the voltage node is above the predetermined level.

BRIEF DESCRIPTION OF THE DRAWINGS

The above mentioned and other features and objects of the invention and the manner of attaining them will become more apparent and the invention itself will be best understood by reference to the following description of an embodiment of the invention taken in conjunction with the accompanying drawings, wherein.

DESCRIPTION OF A PREFERRED EMBODIMENT

Figure 1A:
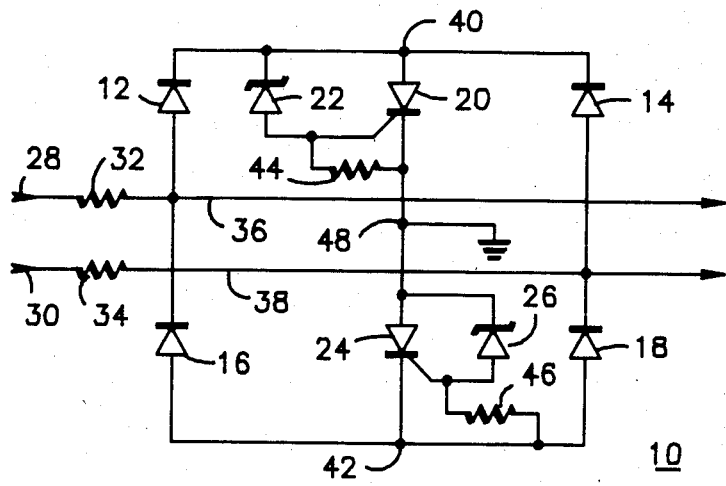
FIG. 1A is a schematic representation of an overvoltage protection circuit in accordance with the present invention utilizing zener diodes and SCR's in conjunction with a conventional diode bridge network.

With reference to FIG. 1A, an overvoltage protection circuit 10 in accordance with the present invention is shown. Overvoltage protection circuit 10 comprises in pertinent part, a diode bridge comprising diodes 12, 14, 16 and 18. The cathodes of diodes 12 and 14 are connected to node 40 while their anodes are respectively coupled to the cathodes of diodes 16 and 18 which are likewise respectively coupled to output lines 36 and 38. The anodes of diodes 16 and 18 are connected to node 42. Output lines 36 and 38 are respectively connected to input lines 28 and 30 by means of resistors 32 and 34 respectively.

An SCR 20 connects node 40 to ground 48. Resistor 44 connects the gate lead of SCR 20 to ground 48 while zener diode 22 has its anode likewise connected to the gate lead of SCR 20 and its cathode connected to node 40. SCR 24 has its cathode connected to node 42 and its anode connected to ground 48. Resistor 46 connects the gate terminal of SCR 24 to node 42 while zener diode 26 has its anode connected to the gate lead of SCR 24 and its cathode connected to ground 48.

In operation, a positive current surge appearing on input line 28 will cause diode 12 to become forward biased thereby increasing the voltage drop across zener diode 22 until its breakdown voltage is reached. At this time, the IR drop across resistor 44 will increase until SCR 20 fires and pulls node 40 to within approximately one volt of the potential at ground 48. In this manner, the overvoltage condition appearing on input line 28 drops voltage through resistor 32 and current flows to ground 48. In like manner, a positive current surge appearing on input line 30 will be coupled to the combination of zener diode 22 and SCR 20 by means of diode 14.

A negative current surge appearing on input line 28 will forward bias diode 16 which will in turn pull down on the cathode and gate of SCR 24. This, in turn, causes a voltage drop across zener diode 26 which has its cathode connected to ground 48. This increased voltage drop across zener diode 26 causes a concomitant IR drop across resistor 46 which causes SCR 24 to turn on thereby bringing node 42 to within approximately one volt below the potential at ground 48. In this manner, the overvoltage condition drops voltage through resistor 32 and the current flows to the potential at ground 48. In like manner, a negative surge on input line 30 is coupled to the combination of SCR 24 and zener diode 26 by means of diode 18.

Figure 1B:
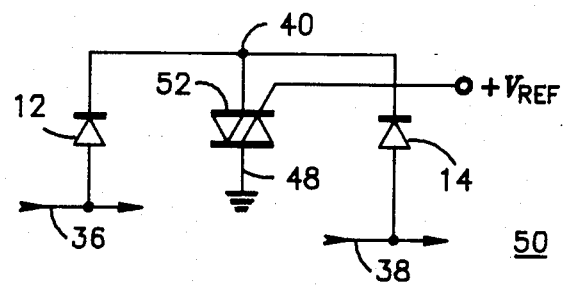
FIG. 1B is a schematic representation of an alternative overvoltage protection circuit in accordance with the present invention utilizing a TRIAC in conjunction with a portion of a conventional bridge network.

Referring additionally now to FIG. 1B, an alternative overvoltage protection circuit 50 is shown. With respect to the embodiment of FIG. 1B, like structure to that above described with respect to FIG. 1A is like numbered and the foregoing description thereof shall suffice as a description herefor. Alternative overvoltage protection circuit 50 utilizes a TRIAC 52 having its main terminal one (MT1) connected to node 40 and its main terminal two (MT2) connected to ground 48. The gate terminal of TRIAC 52 is connected to a positive reference voltage. In operation, alternative overvoltage protection circuit 50, in conjunction with the partial diode bridge network comprising diodes 12 and 14 will cause positive surges appearing on output lines 36 and 38 to be coupled to ground 48.

Figure 2:
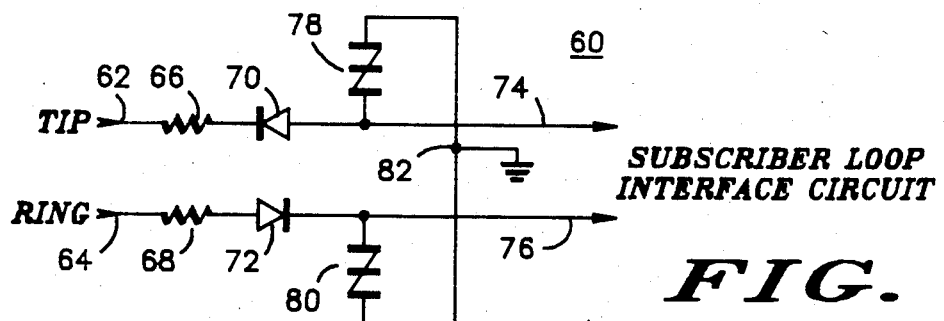
FIG. 2 is a schematic representation of an overvoltage protection circuit in accordance with the present invention utilizing SIDAC's and of particular use in telephone applications.

Referring additionally now to FIG. 2 an additional overvoltage protection circuit 60 is shown of particular usefulness in telephone applications. Input signals to a subscriber loop interface circuit (SLIC) or subsequent telephone equipment are provided on tip line 62 as connected to output line 74 through series connected resistor 66 and diode 70. In like manner, signals input on ring line 64 are coupled to output line 76 through series connected resistor 68 and diode 72. As shown, SIDAC 78 couples output line 74 to ground 82 while SIDAC 80 likewise couples output line 76 to ground 82. In operation, if a high positive voltage transient appeared on tip line 62 and ring line 64, diode 70 would block the transient from appearing on output line 74 and SIDAC 80 would conduct the surge to ground 82. Conversely, diode 72 and SIDAC 78 would protect the SLIC for negative transients appearing on tip line 62 and ring line 64. SIDAC's 78 and 80 will not conduct when normal signals are present on tip line 62 and ring line 64.

In the embodiments above described, diodes 12, 14, 16 and 18 may be furnished as a Motorola MDA220 bridge network available from Motorola Inc., assignee of the present invention. Zener diodes 22 and 26 are chosen such that their breakdown voltages correspond to the respective positive and negative maximum current surges which may be tolerated on input lines 28 and 30. In telephone applications, zener diodes 22 and 26 may have a rating of approximately 50 volts to allow passage of the ringing signal without dumping it to ground 48. SCR's 20 and 24 must have a breakdown voltage greater than that of zener diodes 22 and 26. Similarly, the breakdown voltage of diodes 12, 14, 16 and 18 must be greater than that of zener diodes 22 and 26. The value of resistors 44 and 46 determine the holding current after the firing of SCR's 20 and 24 respectively and determine at what point the SCR's shut off. SIDAC's 78 and 80 may be furnished as Motorola MK1V105 and MK1V135 units respectively available from Motorola Inc, assignee of the present invention. A further description of SLIC applications and of primary overvoltage protection for tip line 62 and ring line 64 is contained in an article by Leland T. Brown and Byron G. Bynum, "One Chip Closes In On SLIC Functions", *Electronic Design*, Sept. 27, 1980, the description therein being hereby incorporated by reference.

What has been provided therefore is an improved overvoltage protection circuit which does not require connection to the central office power source and is of particular utility in telephonic applications. The overvoltage protection circuit of the present invention is readily and inexpensively fabricated utilizing a minimum of components and can provide overvoltage protection for surge currents of any predetermined value.

While there have been described above the principles of the invention in conjunction with specific apparatus, it is to be clearly understood that this description is made only by way of example and not as a limitation to the scope of the invention.

We claim:

1. An overvoltage protection circuit for directing a surge current on first and second telephone lines, each having respective input and output terminals, to a ground terminal when said surge current exceeds a predetermined level thereof comprising:

a ground terminal;

first and second telephone lines, each having respective input and output terminals;

first and second diodes having respective anode and cathode terminals thereof, said first diode having said cathode terminal coupled to the input terminal of said first telephone line and said anode terminal connected to the output terminal of said first telephone line, said second diode having said anode terminal coupled to the input terminal of said second telephone line and said cathode terminal connected to the output terminal of said second telephone line; and first and second bilateral trigger devices respectively coupling the output terminals of said first and second telephone lines to said ground terminal.

2. The overvoltage protection circuit of claim 1 wherein said first and second bilateral trigger devices comprise SIDAC's.

3. An overvoltage protection circuit for directing a surge current on first and second telephone lines to a ground terminal when said surge current exceeds a predetermined level thereof comprising:
- a ground terminal;
- first and second telephone lines;
- a first diode having anode and cathode terminals, said anode terminal of said first diode coupled to said first telephone line;
- a second diode having anode and cathode terminals, said anode terminal of said second diode coupled to said second telephone line; and
- a TRIAC having first and second main terminals and a gate terminal, said first main terminal coupled to said cathode terminals of said first and second diodes, said second main terminal coupled to said ground terminal and said gate terminal for coupling to a reference voltage.

* * * * *